United States Patent

Regnier et al.

[11] 3,898,230
[45] Aug. 5, 1975

[54] SYDNONE IMINE COMPOUNDS

[75] Inventors: Gilbert Regnier, Chatenay-Malabry; Roger Canevari, Villebon sur Yvette; Michel Laubie, Vaucresson, all of France

[73] Assignee: Science Union et Cie., Societe Francaise de Recherche Medicale, Suresnes, France

[22] Filed: Aug. 2, 1972

[21] Appl. No.: 277,213

[30] Foreign Application Priority Data
Aug. 26, 1971 United Kingdom............... 40037/71

[52] U.S. Cl..... 260/256.4 N; 260/240.1; 260/240.9; 260/249.5; 260/256.4 R; 260/256.4 C; 260/268 BC; 260/268 PH; 260/268 H; 424/249; 424/250; 424/251
[51] Int. Cl.............................................. C07d 51/42
[58] Field of Search 260/256.4 N, 256.4 C, 256.4 R

[56] References Cited
UNITED STATES PATENTS
3,312,690   4/1967   Masuda et al. ..................... 260/239

OTHER PUBLICATIONS
Morrison et al., –"Organic Chemistry", Allyn & Bacon, Inc., Boston, (1959),–page 367.
Smith, P.,–"Open–Chain Nitrogen Compounds", Vol. 1, W. A. Benjamin, Inc., New York,–1965,–page 307.

Primary Examiner—Donald G. Daus
Assistant Examiner—Raymond V. Rush
Attorney, Agent, or Firm—Omri M. Behr

[57] ABSTRACT

Sydnone imines of general formula:

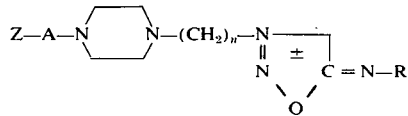

wherein Z is alkoxy- or alkylenedioxy phenyl, phenoxy, benzhydryl, benzodioxane or a heterocyclic radical, A is a single bond or methylenic chain, $n$ is 0 or 2, and R is a hydrogen atom or an acyl radical. These compounds possess antihypertensive and antianginous properties.

7 Claims, No Drawings

SYDNONE IMINE COMPOUNDS

The present invention provides a sydnone imine derivative of the general formula I:

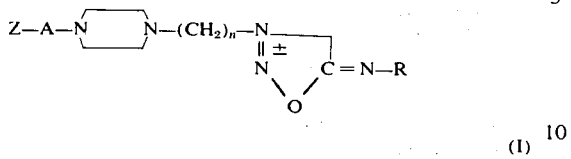

(I)

wherein:

Z represents:
a. a mono-or poly-alkoxy phenyl radical wherein the alkoxy moiety has from 1 to 4 carbon atoms or a mono- or di-alkylenedioxy phenyl radical wherein the alkylenedioxy moiety has from 1 to 2 carbon atoms;
b. a phenoxy radical which may be substituted by one or more halogen atoms or alkyl or alkoxy radicals containing from 1 to 4 atoms;
c. a benzhydryl radical optionally substituted on the phenyl rings by one or more halogen atoms.
d. a radical of the general formula:

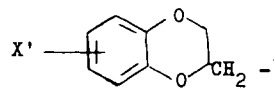

wherein X' represents a hydrogen atom, a halogen atom or an alkyl or alkoxy radical containing from 1 to 4 carbon atoms; or
e. a heterocyclic radical of the general formula

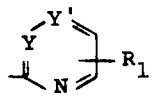

wherein Y and Y', which may be the same or different each represents N or CH and $R_1$ represents hydrogen, a alkyl or alkoxy radical containing from 1 to 4 carbon atoms;

A represents a single bond or a linear or branched methylenic radical containing from 1 to 4 carbon atoms optionally having an ethylenic double bond;
$n$ represents 0 or 2; and
R represents a hydrogen atom or an acyl radical derived from a carboxylic, or a carbamic acid, of the general formula $R_2 - CO -$ wherein $R_2$ represents:
a. a hydrogen atom
b. a lower aliphatic radical containing from 1 to 6 carbon atoms in a linear or branched chain, which may contain, a carboxylic or a hydroxyl group,
c. an aryl, an aralkyl, an arylalkenyl or an aryloxyalkyl radical wherein the aryl moieties may be substituted by one or more, preferably one, two or three, halogen atoms, for example chlorine and/or fluorine atoms, alkyl or alkoxy radicals containing from 1 to 5 carbon atoms or by one or two methylenedioxy or ethylenedioxy radicals,
d. a pyridyl or a pyridyl-lower alkyl radical wherein the alkyl moiety has from 1 to 5 carbon atoms, or
e. an amino radical of the general formula

wherein $R_3$ represents a hydrogen atom, an alkyl or alkenyl radical containing from 1 to 5 carbon atoms and $R_4$ represents an alkyl or alkenyl radical containing from 1 to 5 carbon atoms or a phenyl radical.

A compound of the general formula I wherein R is a hydrogen atom is prepared by a process analogous to that described in the U.S. Pat. No. 3,312,690, according to the following equations:

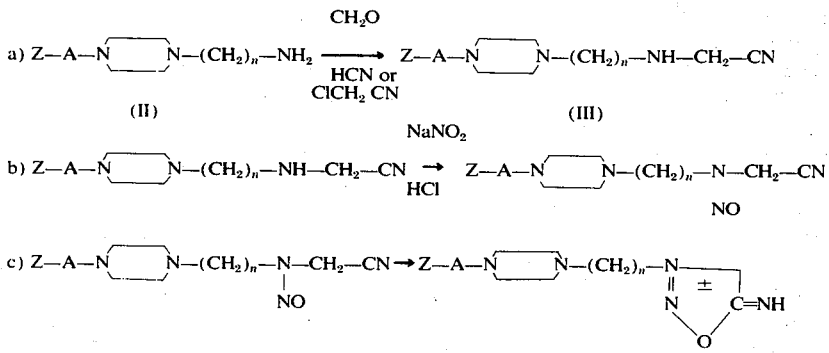

The step (a) may be carried out, in the case where $n$ is 0, for example, by treating a mineral acid addition salt of an amine of the general formula II with a slight excess of sodium cyanide, in the presence of an aqueous formaldehyde solution, at a temperature within the range of from 0° to 25°C. In the case where $n$ is 2, it is more convenient to carry out step (a) by condensing chloracetonitrile with an excess of the amine II, which acts as acceptor for the hydrochloric acid formed during the reaction, in the presence of a weak polar aprotonic solvent, for example tetrahydrofuran or dioxan, at a temperature within the range of from 25° to 80°C.

The step (b) may be carried out, for example, by treating a mineral acid addition salt of an aminonitrile of the general formula III with an excess of an aqueous sodium nitrite solution at a temperature within the range of from 0° to 25° C.

The step (c) may be carried out for example, by treating, at room temperature, a nitrosoaminonitrile of the general formula IV with an excess of a methanolic hydrochloric acid solution in the case where $n$ is 0 or with an excess of an aqueous hydrochloric acid solution in the case where n is 2.

The sydnone imines of the general formula I wherein R represents an acyl radical is prepared, by acylating a sydnone imine of the general formula I wherein R is a hydrogen atom. One of the most satisfactory ways of carrying out this process comprises treating a mineral acid addition salt of a sydnone imine of the general formula I wherein R is a hydrogen atom, with a suitable derivative of a desired acid for example, a halide, an anhydride, a lactone or an iso-cyanate, at a temperature within the range of from 0° to 25°C, in the presence of a large excess of a tertiary organic base, for example pyridine, which acts as acceptor for the hydrohalic acid or the carboxylic acid formed during the reaction.

The compounds of the present invention are weak bases which may be converted with acids into acid addition salts, which are also included within the scope of the present invention. As acids used to form these salts, there may be especially mentioned, for example, in the mineral series: hydrochloric, hydrobromic, sulphuric and phosphoric acids and in the organic series: acetic, propionic, maleic, fumaric, tartaric, citric, oxalic, benzoic, methanesulphonic and isethionic acids.

The compounds of the general formula I and acid addition salts thereof may be purified by crystallisation or chromatographic absorption.

The compounds of the present invention and the physiologically tolerable salts thereof possess soluable pharmacological and therapeutic properties, especially hypotensive, vasodilator and antiangionous properties.

Their toxicity is weak and the LD 50 determined in mice by intraperitoneal route.

The hypotensive activity of the new compounds was studied in normal and hypertonic, anesthetised and non anesthetised dogs. It was observed that doses of 0.5 to 5 mg/Kg of these compounds when administered intravenously or perorally decrease the blood presure by from about 20 to more than 60 mm Hg. In the same time the decrease of the pulmonary pressure and that of the myocardial oxygen consumption are also observed.

The above described properties and the low toxicity allow the use of the new compounds in therapy, especially in the treatment of hypertension and angina pectoris.

The present invention also provides pharmaceutical compositions containing a compound of general formula I or a physiologically tolerable salt thereof in admixture or conjunction with a suitable pharmaceutical carrier, such for example, as distilled water, glucose, lactose, talc, starch, ethycellulose or cocoa butter. The pharmaceutical forms may be tablets, capsules, suppositories or solutions for oral, rectal or parenteral administration at doses of 5 to 300 mg preferably 25 to 100 mg 1 to 5 times a day.

The present invention also provides a pack comprising a pharmaceutical preparation of the invention together with instructions, the instructions requiring that it be administered orally, rectally or parenterally, 1 to 5 times a day, in the doses of from 5 to 300 mg especially for the treatment of hypertensions and angina pectoris.

The following Examples illustrate the invention. The melting points were determined in a capillary tube, unless otherwise stated.

EXAMPLE I

3-[4-(2-pyrimidinyl)-1-piperazinyl]-sydnone imine, dihydrochloride

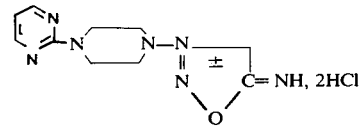

150 ml of a methanolic solution containing 30% of dry hydrogen chloride were added to a solution of 15 g (0.060 mole) of N-[4-(2-pyrimidinyl)-1-piperazinyl]-N-nitroso-aminoacetonitrile, M.P.: 97°–100°C, in 250 ml of methanol. The mixture was allowed to stand at room temperature for 6 hours. There was obtained 10.5 g of 3-[4-(2-pyrimidinyl)-1-piperazinyl]-1 sydnone imine dihydrochloride (white crystals) melting at 183°C with decomposition, which were suctioned off. (Yield: 54 %). The N-[4-(2-pyrimidinyl)-1-piperazinyl]-N-nitroso-amino-acetonitrile used as starting material was prepared by nitrosation, with an excess of sodium nitrite in hydrochloric acid medium, of [4-(2-pyrimidinyl)-1-piperazinyl]-aminoacetonitrile, melting at 82°–85°C, itself prepared, according to the Mannich reaction, starting from an excess of a formaldehyde solution, sodium cyanide and 1-amino-4-(2-pyrimidinyl)-piperazine dihydrochloride melting at 241°–244°C.

EXAMPLES 2 To 6

The compounds listed in Table I were prepared by methods analogous to the process described in Example I. This table also contains the melting points of the starting materials.

TABLE I

General Formula:

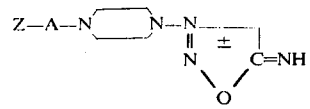

| Ex. No. | Z—A— | Isolated Form | Melting Point (dec) | Melting Point of the corresponding N-nitroso-amino aceto-nitrile (IV) | Melting Point of the corresponding aminoacetonitrile (III) |
|---|---|---|---|---|---|
| 2 |  | dihydrochloride | 151°C | 119 – 123°C (base) | 109 – 112°C (base) |

TABLE I—Continued

General Formula:

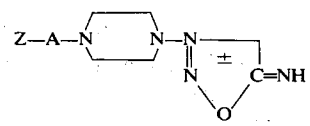

| Ex. No. | Z—A— | Isolated Form | Melting Point (dec) | Melting Point of the corresponding N-nitroso-amino acetonitrile (IV) | Melting Point of the corresponding aminoacetonitrile (III) |
|---|---|---|---|---|---|
| 3 | (pyridinyl) | dihydrochloride | 192°C | 82 – 86°C (base) | 82 – 86°C (base) |
| 4 | H₃CO-C₆H₃(OCH₃)-CH₂ | dihydrochloride | 185°C | Oil | 86 – 90°C (base) |
| 5 | C₆H₄(OCH₃)- | monohydrochloride | 172°C | Oil | 188°C (dec) (dihydrochloride) |
| 6 | benzodioxane-CH₂ | dihydrochloride | 161–163°C | 130°C (Kofler base) | 75°C (Kofler base) |

EXAMPLE 7

3-[4-(2-pyrimidinyl)-1-piperazinyl]-ethyl-sydnone imine, trihydrochloride

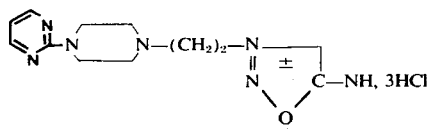

36.5 g of N-[4-(2-pyrimidinyl)-1-piperazinyl]-ethyl-N-nitroso-aminoacetronitrile M.P.: 92°C in solution in 365 ml of a 4N hydrochloric acid solution was cyclised, according to the process described in Example 1. There were obtained 50.5 g of 3-[4-(2-pyrimidinyl)-1-piperazinyl]-ethyl-sydnone imine trihydrochloride, white crystals melting at 170°–180°C with decomposition (Yield: 98%). The N-[4-(2-pyrimidinyl)-1-piperazinyl]-ethyl-N-nitroso-aminoacetonitrile used as starting material was prepared by nitrosation of N-[4-(2-pyrimidinyl)-1-piperazinyl]-ethyl-aminoacetonitrile, M.P.: 200°–208°C (dec), itself prepared by condensing 1 mole of chlor-acetonitrile with 2 moles of N-[4-(2-pyrimidinyl)-1-piperazinyl]-ethylamine, in tetrahydrofuran while refluxing.

EXAMPLES 8

The compounds listed in Table II were prepared by methods analogous to the process described in Example 8. This table also contains the melting points of the starting materials.

TABLE II

General Formula:

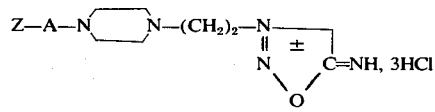

| Ex. No. | Z—A— | Melting Point | Melting Point of the corresponding N-nitroso-amino acetonitrile (IV) | Melting point of the corresponding amino-acetonitrile (III) |
|---|---|---|---|---|
| 8 | H₃CO-C₆H₃(OCH₃)-CH₂ | 187°C (dec) | 73°C (Kofler) base | 188 – 190°C trihydrochloride |

EXAMPLE 9

3-[4-(2-pyrimidinyl)-1-piperazinyl]-N-propionyl-sydnone imine

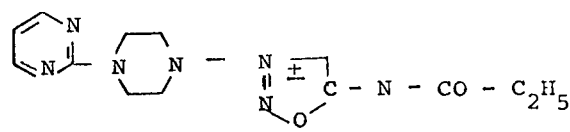

10 g of 3-[4-(2-pyrimidinyl)-1-piperazinyl]-sydnone imine dihydro-chloride, prepared according to the Example 1, were added slowly to a solution of 63.1 ml of propionic anhydride in 366 ml of pyridine. Total dissolution was observed 10 minutes after the completion of the addition. the mixture was allowed to stand at room temperature for 18 hours, then pyridine was evaporated under reduced pressure. The residue was diluted with anhydrous ether, then filtrated off. There were obtained 10 g of crystals that were dissolved in 50 ml of water. This solution was alkalinified, and the precipitated product was suctioned off. There were obtained 6.5 g of crystals which after crystallisation in 40 ml of anhydrous isopropanol gave 5.5 g of 3-[4-(2-pyrimidinyl)-1-piperazinyl]-N-propionyl-sydnone imine, white crystals melting at 146°–147°C. (Yield: 59 %).

EXAMPLES 10 To 24

The compounds listed in the Table III were prepared by methods analogous to the process described in Example 13.

TABLE III

General Formula:

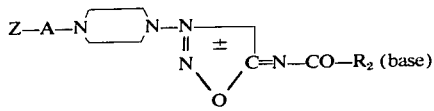

| Ex. No. | Z—A— | $R_2$ | Melting Point |
|---|---|---|---|
| 10 | 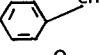 | —$C_2H_5$ | 175 – 178°C (dec) |
| 11 | 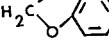 | —$C_2H_5$ | 143 – 145°C (dec) |
| 12 |  | —$C_2H_5$ | 127 – 129°C |
| 13 | 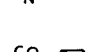 | —$C_2H_5$ | 87 – 90°C (hydrate) |
| 14 | 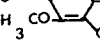 | —$C_2H_5$ | 159 – 161°C |
| 15 | 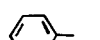 | —$C_2H_5$ | 88 – 90° C |
| 16 | 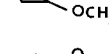 | —$C_2H_5$ | 134° C |
| 17 | 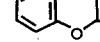 | —$CH_2$—$CH_2$—$CH_3$ | 132 – 133° C |
| 18 | 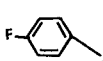 | —$CH_2$—$CH_2$—$CH_3$ | 140 – 141° C |
| 19 | 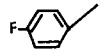 | 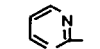 | 122 – 123° C |
| 20 |  | 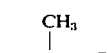 | 140 – 141° C |
| 21 | 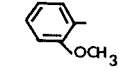 | 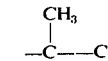 | 170 – 172° C |
| 22 |  |  | 185 – 186° C |

TABLE III — Continued

General Formula:

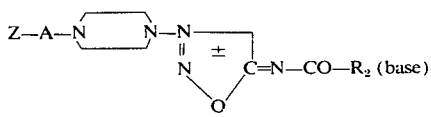

| Ex. No. | Z—A— | R₂ | Melting Point |
|---|---|---|---|
| 23 | (phenyl)-OCH₃ | —NH—(phenyl) | 150 – 152° C |
| 24 | (pyrimidinyl) | —NH—(phenyl) | 155 – 157° C |

What we claim is:

1. A compound selected from the group consisting of:
   a. 3-[4 - (2-pyrimidinyl)-1-piperazinyl] - sydnone imine, 3-[4-(2-pyrimidinyl)-1-piperazinyl] - ethyl - sydnone imine, 3-[4 - (2-pyrimidinyl)-1-piperazinyl]-N- propionyl sydnone imine, 3-[4- (2-pyrimidinyl)-1-piperazinyl] -N- butyryl sydnone imine, 3-[4 - (2-pyrimidinyl) - 1 - piperazinyl]- N - pivaloyl sydnone imine, 3 - [4-(2 - pyrimidinyl)-1- piperazinyl] - N -(3,4,5, - trimethoxybenzoyl) sydnone imine, and
   b. physiologically tolerable acid addition salts thereof.

2. 3-[4 - (2-pyrimidinyl)-1-piperazinyl] - sydnone imine and physiologically tolerable acid addition salts thereof being compounds of claim 1.

3. 3-[4 - (2-pyrimidinyl)-1-piperazinyl] - ethyl-sydnone imine and physiologically tolerable acid addition salts thereof being compounds of claim 1.

4. 3-[4 - (2-pyrimidinyl)-1-piperazinyl] - N - propionyl sydnone imine and physiologically tolerable acid addition salts thereof being compounds of claim 1.

5. 3-[4 - (2-pyrimidinyl) - 1 - piperazinyl] - N - butyryl sydnone imine and physiologically tolerable acid addition salts thereof being compounds of claim 1.

6. 3-[4 - (2-pyrimidinyl) - 1 - piperazinyl] - N - pivaloyl sydnone imine and physiologically tolerable acid addition salts thereof being compounds of claim 1.

7. 3-[4 - (2-pyrimidinyl) - 1 - piperazinyl] - N - (3,4,5, - trimethoxybenzoyl) sydnone imine and physiologically tolerable acid addition salts thereof being compounds of claim 1.

* * * * *